United States Patent
Speight

(10) Patent No.: US 10,085,195 B2
(45) Date of Patent: Sep. 25, 2018

(54) DYNAMIC ROUTER FUNCTIONALITY IN CELLULAR NETWORKS

(71) Applicant: Virtuosys Limited, Bath and North East Somerset (GB)

(72) Inventor: Timothy James Speight, Monmouthshire (GB)

(73) Assignee: Virtuosys Limited, Bath and North East Somerset (GB)

(*) Notice: Subject to any disclaimer, the term of this patent is extended or adjusted under 35 U.S.C. 154(b) by 28 days.

(21) Appl. No.: 15/293,928

(22) Filed: Oct. 14, 2016

(65) Prior Publication Data
US 2017/0111840 A1    Apr. 20, 2017

(30) Foreign Application Priority Data

Oct. 16, 2015 (GB) .................................. 1518317.1

(51) Int. Cl.
*H04W 36/22* (2009.01)
*H04L 12/851* (2013.01)
(Continued)

(52) U.S. Cl.
CPC ............ *H04W 36/22* (2013.01); *H04L 47/24* (2013.01); *H04W 28/08* (2013.01); *H04W 36/14* (2013.01);
(Continued)

(58) Field of Classification Search
CPC ..... H04W 36/22; H04W 28/08; H04W 48/18; H04W 36/14; H04W 88/06; H04W 88/04;
(Continued)

(56) References Cited

U.S. PATENT DOCUMENTS

| 8,743,758 | B1 | 6/2014 | Bhargava |
| 9,451,654 | B2 | 9/2016 | Jafarian |

(Continued)

FOREIGN PATENT DOCUMENTS

| EP | 2738995 | 6/2014 |
| EP | 2802188 | 11/2014 |

(Continued)

OTHER PUBLICATIONS

Combined Search and Examination Report under Sections 17 and 18(3); British Patent Application No. GB1518317.1, dated Mar. 30, 2016.

(Continued)

*Primary Examiner* — Thai Nguyen
(74) *Attorney, Agent, or Firm* — Fitch, Even, Tabin & Flannery LLP

(57) ABSTRACT

A wireless remote communication unit is described. The wireless remote communication unit comprises: at least one transceiver configured to communicate with a cellular network node using either a first technology employed with mesh connectivity via at least one other wireless remote communication unit or a second technology employed with a direct connection to the cellular network node; and a processor coupled to the at least one transceiver and configured to select internet connectivity using either: a first internet protocol, IP, address associated with mesh functionality to route low priority, high delay tolerant data via an edge router and the cellular network node; or a second IP address associated with direct connection to the cellular network node for high priority, low delay tolerant data.

5 Claims, 10 Drawing Sheets

(51) Int. Cl.
*H04W 36/14* (2009.01)
*H04W 48/18* (2009.01)
*H04W 28/08* (2009.01)
H04W 84/04 (2009.01)
H04W 84/18 (2009.01)
H04W 88/04 (2009.01)
H04W 88/06 (2009.01)
H04L 29/12 (2006.01)

(52) U.S. Cl.
CPC ......... *H04W 48/18* (2013.01); *H04L 61/2007* (2013.01); *H04W 84/042* (2013.01); *H04W 84/18* (2013.01); *H04W 88/04* (2013.01); *H04W 88/06* (2013.01)

(58) Field of Classification Search
CPC .... H04W 84/042; H04W 84/18; H04L 47/24; H04L 61/2007
See application file for complete search history.

(56) References Cited

U.S. PATENT DOCUMENTS

| | | | |
|---|---|---|---|
| 9,495,511 | B2 | 11/2016 | Harrington |
| 2005/0288008 | A1 | 12/2005 | Shimizu |
| 2009/0161601 | A1 | 6/2009 | Dai |
| 2009/0185538 | A1 | 7/2009 | Choi |
| 2009/0300191 | A1 | 12/2009 | Pace |
| 2010/0299441 | A1 | 11/2010 | Hughes |
| 2012/0120962 | A1 | 5/2012 | Ll |
| 2012/0238208 | A1 | 9/2012 | Bienas |
| 2012/0321008 | A1 | 12/2012 | Krishnaswamy |
| 2014/0004865 | A1 | 1/2014 | Bhargava |
| 2014/0126410 | A1* | 5/2014 | Agarwal ............... H04W 24/02 370/252 |
| 2014/0162661 | A1 | 6/2014 | Shaw |
| 2014/0302850 | A1 | 10/2014 | Young |
| 2015/0043349 | A1 | 2/2015 | Zhu |
| 2015/0078167 | A1 | 3/2015 | Papa |
| 2015/0140993 | A1 | 5/2015 | Horn |
| 2015/0163840 | A1 | 6/2015 | Ji |
| 2016/0143080 | A1 | 5/2016 | Enomoto |
| 2016/0173297 | A1* | 6/2016 | Kanugovi ........... H04L 12/4633 370/328 |
| 2016/0227440 | A1 | 8/2016 | Forssell |
| 2016/0227467 | A1* | 8/2016 | Tomici ................. H04W 48/16 |
| 2016/0269355 | A1 | 9/2016 | Lee et al. |

FOREIGN PATENT DOCUMENTS

| | | |
|---|---|---|
| GB | 2438664 A | 5/2007 |
| WO | 2009084051 | 7/2009 |
| WO | 2011153507 A2 | 12/2011 |
| WO | 2011122508 A2 | 9/2012 |
| WO | 2015005158 | 1/2015 |
| WO | 2015056940 | 4/2015 |
| WO | 20150074808 | 5/2015 |

OTHER PUBLICATIONS

Combined Search and Examination Report Under Sections 17 and 18(3); British Patent Application No. GB1518318.9, dated Mar. 31, 2016.
Search Report Under Section 17, British Patent Application No. GB1418320.5, dated Mar. 21, 2016.
Search Report Under Section 17; British Patent Application No. GB1518315.5, dated Mar. 18, 2016.
Extended European Search Report; European Patent Application No. 16193802.2-1854, dated Mar. 2, 2017.
Extended European Search Report; European Patent Application No. 16193806.3-1854, dated Mar. 2, 2017.
Extended European Search Report; European Patent Application No. 16193810.5-1857, dated Mar. 8, 2017.
Extended European Search Report; European Patent Application No. 16193812.1-1854, dated Mar. 2, 2017.
Communication Pursuant to Article 94(3); European Patent Application No. 16193806.3-1214, dated Feb. 9, 2018.

* cited by examiner

FIG. 1 - Prior Art

DYNAMIC ROUTER FUNCTIONALITY IN CELLULAR NETWORKS

RELATED APPLICATION(S)

This application claims the benefit of Great Britain Application No. 1518317.1 filed Oct. 16, 2015. The content of this application is fully incorporated herein in its entirety.

TECHNICAL FIELD

The field of this invention relates generally to wireless communication units performing router functionality at the edge of wireless cellular communication systems.

BACKGROUND

A recent development in third generation (3G) wireless communications is the long term evolution (LTE) cellular communication standard, sometimes referred to as $4^{th}$ generation (4G) systems. Both of these technologies are compliant with third generation partnership project (3GPP™) standards. Irrespective of whether LTE spectral allocations use existing second generation (2G) or 3G allocations being re-farmed for fourth generation (4G) systems, or new spectral allocations for existing mobile communications, they will generally use paired spectrum for frequency division duplex (FDD) operation.

LTE (and other cellular technologies) supports the operation of IPv6. Using IPv6 is convenient for the arrangement where the LTE UE acts as a router to allow for IP connectivity for many end user devices, possibly in a number of different subnets.

Directed mesh topology is one where a mesh network exists but there is at least one sink node which provides connectivity into the network. Within this context there are 3 types of devices: End nodes, Mesh routers, and Edge routers.

End nodes are communication devices that communicate using mesh transport technology (typically WiFi™) to either an edge router or a mesh router. An end node device provides no routing functionality for data from other devices. End node devices may obtain an Internet Protocol (e.g. IPv6) prefix (address) from router advertisements sent from edge router, which may be relayed through mesh routers. End node communication devices do not have routing capability and can only operate as 'leaves' in the mesh network.

Mesh router devices are communication devices that communicate using mesh transport technology (typically WiFi™) to either an edge router or another mesh router. Mesh routers are able to support routing in the mesh network, i.e. they can relay traffic from a second node (either end node or another mesh router) towards the edge router. Mesh router devices provide routing functionality for data from other devices, which may be either an end node or another mesh router. Mesh router devices also obtain an IPv6 prefix (address) from router advertisements sent from edge router, which may be relayed through mesh routers.

Edge routers not only manage the mesh network and communicate with either end nodes or mesh routers, but also provide routing into the wider IP network, typically a cellular network or the public internet via a backhaul link, thereby linking the mesh network to the cellular network and routing traffic between the two technologies. The backhaul link can be accomplished by a number of technologies for example a wired Ethernet connection, WiFi™ link or possibly a cellular technology connection. This results in networks that have to be planned. Edge routers act as a requesting router in IPv6 prefix (address) delegation to obtain an IPv6 prefix, which it uses in router advertisements advertising this prefix value into the mesh network. There is at least one edge router in each mesh cluster. In the home environment, the edge router must be placed in a central location so as to provide connectivity throughout the house. In the wider outdoor environment, edge router locations have to be planned by a central authority, typically up lampposts or in locations where they have good coverage. This is extremely limiting because it means that expensive devices have to purchased and the network relies on a central authority that can charge additional fees to users.

U.S. Pat. No. 8,743,758 B1 describes a system providing concurrent uses of non-cellular interfaces for participating in both hybrid cellular and non-cellular networks.

SUMMARY OF THE INVENTION

In a first aspect of the invention, a wireless remote communication unit is described. The wireless remote communication unit comprises: at least one transceiver configured to communicate with a cellular network node using either a first technology employed with mesh connectivity via at least one other wireless remote communication unit or a second technology employed with a direct connection to the cellular network node; and a processor coupled to the at least one transceiver and configured to select internet connectivity using either: a first internet protocol, IP, address associated with mesh functionality to route low priority, high delay tolerant data via an edge router and the cellular network node; or a second IP address associated with direct connection to the cellular network node for high priority, low delay tolerant data.

In this manner a wireless remote communication unit, such as a user equipment that is able to use two different routes (and IP addresses) to an internet, e.g. either direct to a network node such as a base station or eNodeB, or via a mesh network, can select an optimal route.

In an optional example, the processor may be further configured to: determine whether the mesh connectivity exceeds a threshold for the wireless remote communication unit's traffic requirement; and release, in response thereto, a direct connection to the cellular network node and use only the first IP address associated with mesh connectivity.

In a second aspect of the invention, an integrated circuit for a wireless remote communication unit is described. The integrated circuit comprises: at least one transceiver port configured to communicate with a cellular network node using either a first technology employed with mesh connectivity via at least one other wireless remote communication unit or a second technology employed with a direct connection; and a processor coupled to the at least one transceiver port and configured to select internet connectivity using either: a first internet protocol, IP, address associated with mesh functionality to route low priority, high delay tolerant data via an edge router and the cellular network node; or a second IP address associated with direct connection to the cellular network node for high priority, low delay tolerant data.

In a third aspect of the invention, a method for a wireless remote communication unit is described. The method comprises communicating with a cellular network node using either a first technology employed with mesh connectivity via at least one other wireless remote communication unit or a second technology employed with a direct connection; and selecting internet connectivity for communication using either: a first internet protocol, IP, address associated with mesh functionality to route low priority, high delay tolerant data via an edge router and the cellular network node; or a second IP address associated with direct connection to the cellular network node for high priority, low delay tolerant data.

In a fourth aspect of the invention, a non-transitory tangible computer program product comprising executable code stored therein for selecting internet connectivity is described. The code is operable for, when executed at a wireless remote communication unit: communicating with a cellular network node using either a first technology employed with mesh connectivity via at least one other wireless remote communication unit or a second technology employed with a direct connection; and selecting internet connectivity for communication using either: a first internet protocol, IP, address associated with mesh functionality to route low priority, high delay tolerant data via an edge router and the cellular network node; or a second IP address associated with direct connection to the cellular network node for high priority, low delay tolerant data.

In a fifth aspect of the invention, a wireless communication system comprising: at least one cellular network node; and multiple wireless remote communication units operably connectable to the at least one cellular network node. A wireless remote communication unit comprises: at least one transceiver configured to communicate with a cellular network node using either a first technology employed with mesh connectivity via at least one other wireless remote communication unit or a second technology employed with a direct connection; and a processor coupled to the at least one transceiver and configured to select internet connectivity using either: a first internet protocol, IP, address associated with mesh functionality to route low priority, high delay tolerant data via an edge router and the cellular network node; or a second IP address associated with direct connection to the cellular network node for high priority, low delay tolerant data.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Example embodiments of the present invention are described with respect to a remote wireless communication unit performing any of a number of roles in a communication system, depending upon its capabilities, the prevailing communication conditions and its location.

In a first example, a remote wireless communication unit may be re-configured to allow data packets to be routed from one technology to another technology. In this first example, routing from one technology to another technology may encompass, in an uplink (UL) case packets being transmitted using a first WiFi™ technology (optionally encapsulated in a tunnel) and then transmitted using a second technology, say using a direct LTE™ technology and connection.

Hereafter, the remote wireless communication unit being re-configured for routing data packets from one technology to another technology is termed functioning as a 'router' or, in instances where the router is located towards the edge of a cellular coverage area an 'edge router'. In some examples, the function of the router results in link layer headers being modified from one technology to the other but, for the network layer and above, the packet contents remains substantially unaltered.

In a second example, a remote wireless communication unit may be re-configured to transfer data packets from one node to another node within a mesh network. In this example, data packets may be transferred using a first technology based on, at least in part, information obtained from received messages from at least one other wireless remote communication unit within the mesh. Hereafter, the remote wireless communication unit being re-configured for transferring data packets from one node to another node within a mesh network is termed functioning as a 'mesh router'.

Figure 1:
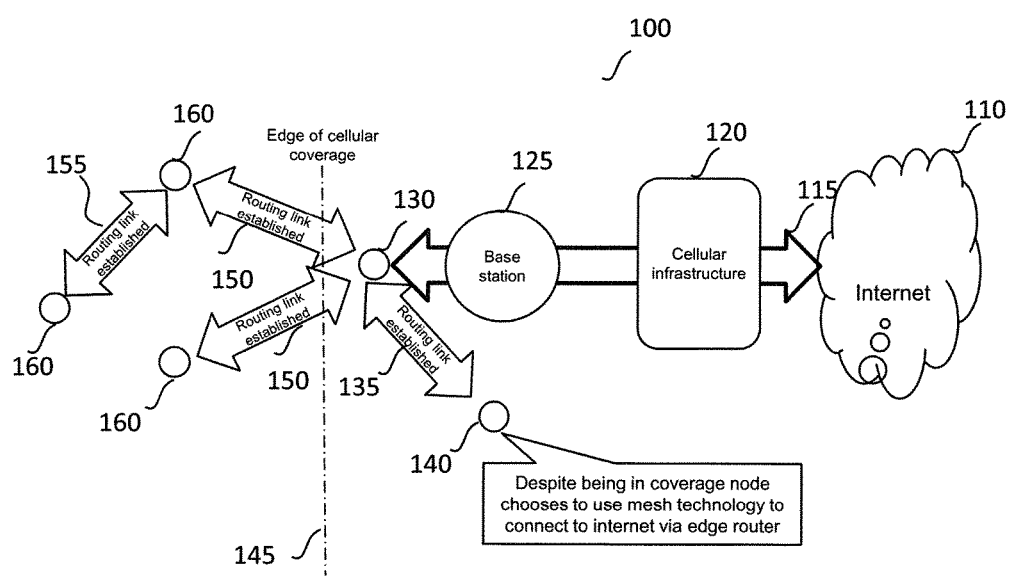
FIG. 1 illustrates an overview of a known wireless communication system whereby a mobile station at the edge of a coverage area of a communication cell is configured to act as a router.
Figure 2:
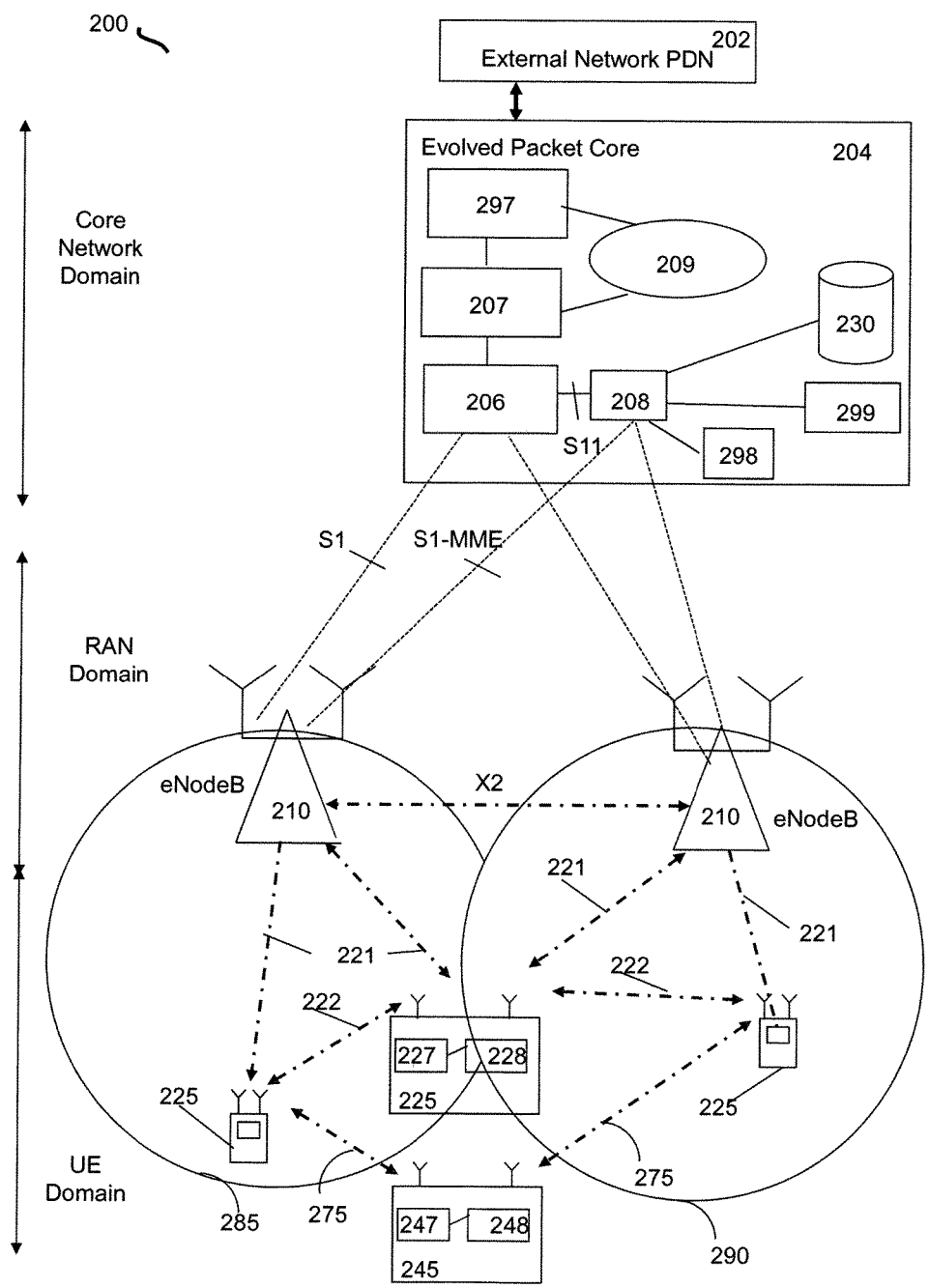
FIG. 2. illustrates a 3GPP™ LTE cellular communication system adapted in accordance with some example embodiments of the present invention.

Referring now to FIG. 2, a wireless communication system 200 is shown in outline, in accordance with one example embodiment of the invention. In this example embodiment, the wireless communication system 200 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 200 architecture consists of radio access network (RAN) and core network (CN) elements 204, with the core network elements 204 being coupled to external networks 202 (named Packet Data Networks (PDNs)), such as the Internet or a corporate network. The CN elements 204 comprise a packet data network gateway (P-GW) 207. In order to serve up local content, the P-GW may be coupled to a content provider. The P-GW 207 may be further coupled to a policy control and rules function entity (PCRF) 297 and a Gateway 206.

The PCRF 297 is operable to control policy control decision making, as well as for controlling the flow-based charging functionalities in a policy control enforcement function PCEF (not shown) that may reside in the P-GW 207. The PCRF 297 may further provide a quality of service (QoS) authorisation class identifier and bit rate information that dictates how a certain data flow will be treated in the PCEF, and ensures that this is in accordance with a wireless communication unit's 225 subscription profile.

In example embodiments, the Gateway 206 is a Serving Gateway (S-GW). The Gateway 206 is coupled to a mobility management entity MME 208 via an S11 interface. The MME 208 is operable to manage session control of Gateway bearers and is operably coupled to a home subscriber server (HSS) database 230 that is arranged to store subscriber wireless communication unit 225 (such as user equipment (UE)) related information. As illustrated, the MME 208 also has a direct connection to each eNodeB 210, via an S1-MME interface.

The HSS database 230 may store wireless communication unit subscription data such as QoS profiles and any access restrictions for roaming. The HSS database 230 may also store information relating to the P-GW 207 to which wireless communication unit 225 can connect. For example, this data may be in the form of an access point name (APN) or a packet data network (PDN) address. In addition, the HSS database 230 may hold dynamic information relating to the identity of the MME 208 to which a UE 225 is currently connected or registered.

The MME 208 may be further operable to control protocols running between the wireless communication unit 225 and the CN elements 204, which are commonly known as Non-Access Stratum (NAS) protocols. The MME 208 may support at least the following functions that can be classified as: functions relating to bearer management (which may include the establishment, maintenance and release of bearers), functions relating to connection management (which may include the establishment of the connection and security between the network and wireless communication unit 225) and functions relating to inter-working with other networks (which may include the handover of voice calls to legacy networks). The Gateway 206 predominantly acts as a mobility anchor point and is capable of providing internet protocol (IP) multicast distribution of user plane data to eNodeBs 210. The Gateway 206 may receive content via the P-GW 207, from one or more content providers 209 or via the external PDN 202. The MME 208 may be further coupled to an evolved serving mobile location center (E-SMLC) 298 and a gateway mobile location center (GMLC) 299.

The E-SMLC 298 is operable to manage the overall coordination and scheduling of resources required to find the location of the UE that is attached to the RAN, in this example embodiment the E-UTRAN. The GMLC 299 contains functionalities required to support location services (LCS). After performing an authorisation, it sends positioning requests to the MME 208 and receives final location estimates.

The P-GW 207 is operable to determine IP address allocation for wireless communication unit 225, as well as QoS enforcement and flow-based charging according to rules received from the PCRF 297. The P-GW 207 is further operable to control the filtering of downlink user IP packets into different QoS-based bearers (not shown). The P-GW 207 may also serve as a mobility anchor for inter-working with non-3GPP technologies such as CDMA2000 and WiMAX networks.

As the Gateway 206 comprises an S-GW, the eNodeBs 210 would be connected to the S-GW 206 and the MME 208 directly. In this case, all UE packets would be transferred through the S-GW 206, which may serve as a local mobility anchor for the data bearers when a UE 225 moves between eNodeBs 210. The S-GW 206 is also capable of retaining information about the bearers when the wireless communication unit 225 is in an idle state (known as EPS connection management IDLE), and temporarily buffers downlink data while the MME 208 initiates paging of the wireless communication unit 225 to re-establish the bearers. In addition, the S-GW 206 may perform some administrative functions in the visited network, such as collecting information for charging (i.e. the volume of data sent or received from the wireless communication unit 225). The S-GW 206 may further serve as a mobility anchor for inter-working with other 3GPP™ technologies such as GPRS™ and UMTS™.

As illustrated, the CN 204 is operably connected to two eNodeBs 210, with their respective coverage zones or cells 285, 290 and a plurality of wireless communication units 225 receiving transmissions from the CN 204 via the eNodeBs 210. In accordance with example embodiments of the present invention, at least one eNodeB 210 and at least one UE 225 (amongst other elements) have been adapted to support the concepts hereinafter described.

The main component of the RAN is an eNodeB (an evolved NodeB) 210, which performs many standard base station functions and is connected to the CN 204 via an S1 interface and to the wireless communication units 225 via a Uu interface. A wireless communication system will typically have a large number of such infrastructure elements where, for clarity purposes, only a limited number are shown in FIG. 2. The eNodeBs 210 control and manage the radio resource related functions for a plurality of wireless subscriber communication units 225. Each of the wireless communication units 225 comprise a transceiver unit 227 operably coupled to signal processing logic 208 (with one wireless communication unit illustrated in such detail for clarity purposes only). The system comprises many other wireless communication units 225 and eNodeBs 210, which for clarity purposes are not shown.

Notably, in accordance with some example embodiments, one or more in-coverage wireless communication units 225, which may be located towards the edge of LTE™ coverage range, may be selected to be (re-)configured with edge router functionality. In some examples, the edge router functionality may comprise setting up a mesh network supporting, say, WiFi™ communications. In some examples, the mesh network supporting, say, WiFi™ communications, may be used as a gateway to other out-of-coverage wireless communication units, such as wireless communication unit 245. In some examples, wireless communication unit 245 may be configured to operate solely with mesh network communications in order to communicate with the LTE™ EPC 204 via a single or multi-hop WiFi™ communication link to an edge router and thereafter a LTE™ communication link to the LTE™ EPC 204 via an eNodeB 210.

In example embodiments, a mechanism (e.g. an algorithm) is used to select a wireless communication unit to be (re-)configured as an edge router based on neighbor information. Such an approach is in contrast to the known technique of LEACH, which does not use neighbour information. LEACH also assumes same power, whereas example embodiments described here do not make such an unrealistic assumption. In contrast, some examples herein described use a discovery technique to find neighbours and therefore assumes the neighbour has similar technology. In some examples, an alternative to a discovery technique may be used, whereby a predefined algorithm may be employed for turning on beacons in WiFi™ and other nodes/wireless communication units would listen for this beacon and, thus, know that mesh connectivity is available.

In examples of the invention, a dynamically adaptable mesh network is supported using a number of different techniques. In-coverage devices have the choice of using the mesh network or using a direct cellular connection. In examples of the invention, multi-hop mesh functionality is supported to provide connectivity to a mesh edge router for devices within coverage. However, as would be appreciated by a skilled person, it would be difficult to constrain this mesh. Therefore, some examples of the invention make the assumption that in-coverage devices may only use, at most, a single hop to a mesh edge router. Thus, in this manner, in-coverage nodes can only be edge routers or end nodes.

The purpose of out of coverage mesh functionality is to improve coverage. Hence, it is important that those devices that are well away from the edge of cellular coverage are provided with service. As such, in accordance with examples of the invention, multi-hop mesh functionality is allowed for out of coverage devices.

In order to create a mesh it is necessary to first discover devices that can provide mesh connectivity. One known mechanism to achieve this is for all nodes within the mesh to take a turn transmitting the beacon information, as is currently the case in for example 802.11 IBSS (independent BSS also known as ad hoc mode) operation. A device can then find mesh connectivity by simply performing a passive scan attempting to find beacons of an appropriate variety.

In contrast, a one or two stage active process can also be used; first the devices discover each other using simple probes (such as probe request and probe response, in the 802.11 WiFi case); and secondly, optionally, the devices may employ a two-way information exchange process, an example of which would be the service discovery functionality described in 802.11u. This proposed example of a two-way information exchange process is in contrast to a known one-way process when an actual mesh is active, whereby the mesh informs the discovering device about the services it offers, by using information contained in beacon transmissions. In one example, the two-way information exchange may facilitate voting algorithms to determine which device should become the edge router. In another example, if two devices both transmit broadcast information then this can be exchanged in a similar way to a service discovery process. Hence, hereafter within this description, the term 'broadcast' encompasses both sending data in one direction from a device, as well as two devices broadcasting information between each other in a two-way communication manner.

In examples of the invention, the device discovery functionality uses the same transport technology as the mesh (e.g. not cellular communications). Thus, device discovery functionality has approximately the same range as the communication range of the mesh transport technology.

Figure 3:
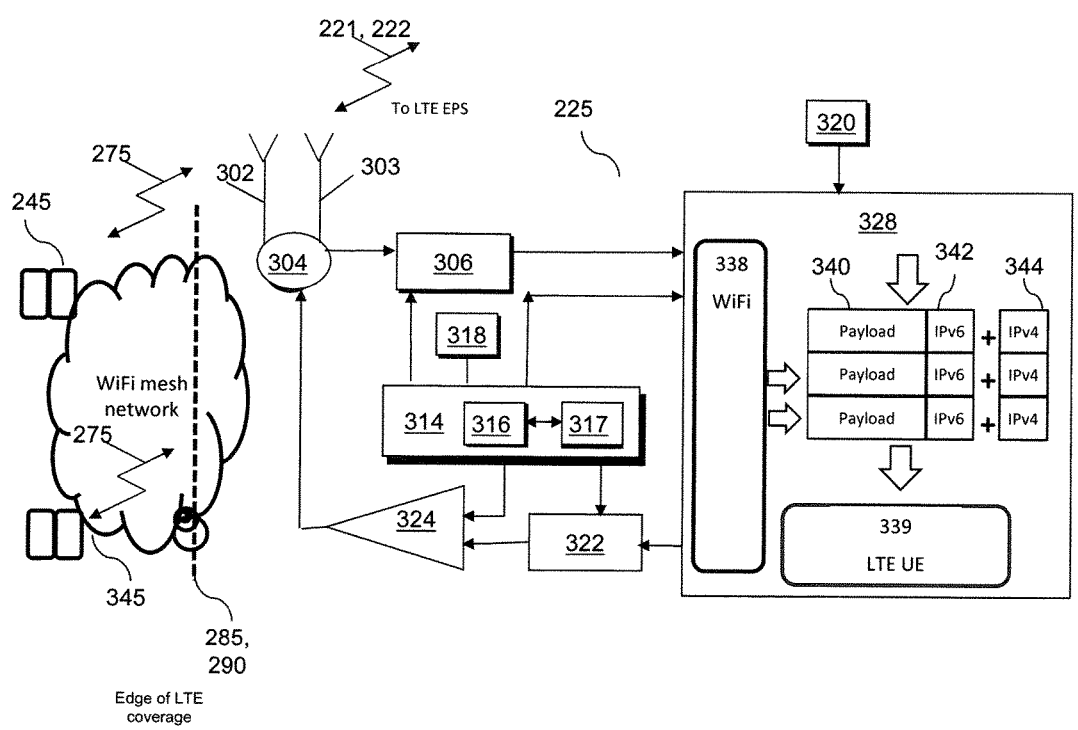
FIG. 3 illustrates an overview of a wireless communication system whereby a wireless communication unit may be configured to perform a variety of roles in accordance with some example embodiments of the present invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a wireless subscriber communication unit, such as a UE 325. The wireless communication unit 325 contains an antenna 302, for receiving transmissions 321, coupled to an antenna switch or duplexer 304 that provides isolation between receive and transmit chains within the wireless communication unit 225, for example providing isolation between LTE™ and WiFi™. One or more receiver chains, as known in the art, include receiver front-end circuitry 306 (effectively providing reception, filtering and intermediate or base-band frequency conversion). The receiver front-end circuitry 306 is coupled to a signal processor 308 (generally realized by a digital signal processor (DSP)). A skilled artisan will appreciate that the level of integration of receiver circuits or components may be, in some instances, implementation-dependent.

The controller 314 maintains overall operational control of the wireless communication unit 325. The controller 314 is also coupled to the receiver front-end circuitry 306 and the signal processor 328. In some examples, the controller 314 is also coupled to a buffer module 317 and a memory device 316 that selectively stores operating regimes, such as decoding/encoding functions, synchronization patterns, code sequences, and the like. A timer 318 is operably coupled to the controller 314 to control the timing of operations (e.g. transmission or reception of time-dependent signals) within the wireless communication unit 225.

As regards the transmit chain, this essentially includes an input module 320, coupled in series through transmitter/modulation circuitry 322 and a power amplifier 324 to the antenna 302, antenna array, or plurality of antennas. The transmitter/modulation circuitry 322 and the power amplifier 324 are operationally responsive to the controller 314.

In accordance with example embodiments, signal processor 328 of wireless communication unit 225 has been configured to support both WiFi™ and LTE™ operation. When configured as an edge router, the wireless communication unit 225 uses both WiFi™ and LTE™ functions. When configured as an end node 245, the wireless communication unit 225 may be configured to only use WiFi functionality. In some examples, the LTE EPS may be used as a tunnel so that the IP address obtained by a LTE™ wireless communication unit 225 may be appended to all data packets, e.g. an IPv6 address 342 and/or an IPv4 address 344 may be appended to each data payload 340 prior to transmission. The data packets are then sent to a gateway in the Network Operator's packet data network PDN (e.g. the Internet) where they are de-encapsulated. In some examples, unique IP addresses (such as IPv6 IP addresses) for all nodes would be obtained directly from the LTE™ EPS. In this case no gateway function is required in the operators PDN.

In some examples, a signal processor 338 supporting WiFi™ may be implemented as distinct from the signal processor 339 supporting LTE™, as shown. Alternatively, a single processor may be used to support both WiFi™ and LTE™ operation. Clearly, the various components within the wireless communication unit 225 can be realized in discrete or integrated component form, with an ultimate structure therefore being an application-specific or design selection.

In accordance with example embodiments, wireless communication unit 225 may be configured to act as an edge router that acts as a gateway between WiFi™ and LTE™. In the illustrated uplink (UL) example data packets are received at WiFi™ antenna 303 over the WiFi (mesh) network 345 and transmitted via LTE™ antenna 302 on an LTE™ bearer 221, 222 to an LTE™ EPS. However, in a downlink (DL) mode of operation, wireless communication unit 225 will receive data packets on a LTE™ bearer 221, 222 on LTE™ network and transmit WiFi signals from WiFi™ antenna 303 over the WiFi (mesh) network 345 to a corresponding end node, e.g. wireless communication unit 245.

Although the illustrated example shows an edge of coverage 285, 290 case, it is envisaged that the wireless communication unit 225 may be configured for the same functionality when in-coverage and using WiFi™ connectivity via an alternative edge router.

Selection of an Edge Router Between Devices within Cellular Coverage

Figure 4:
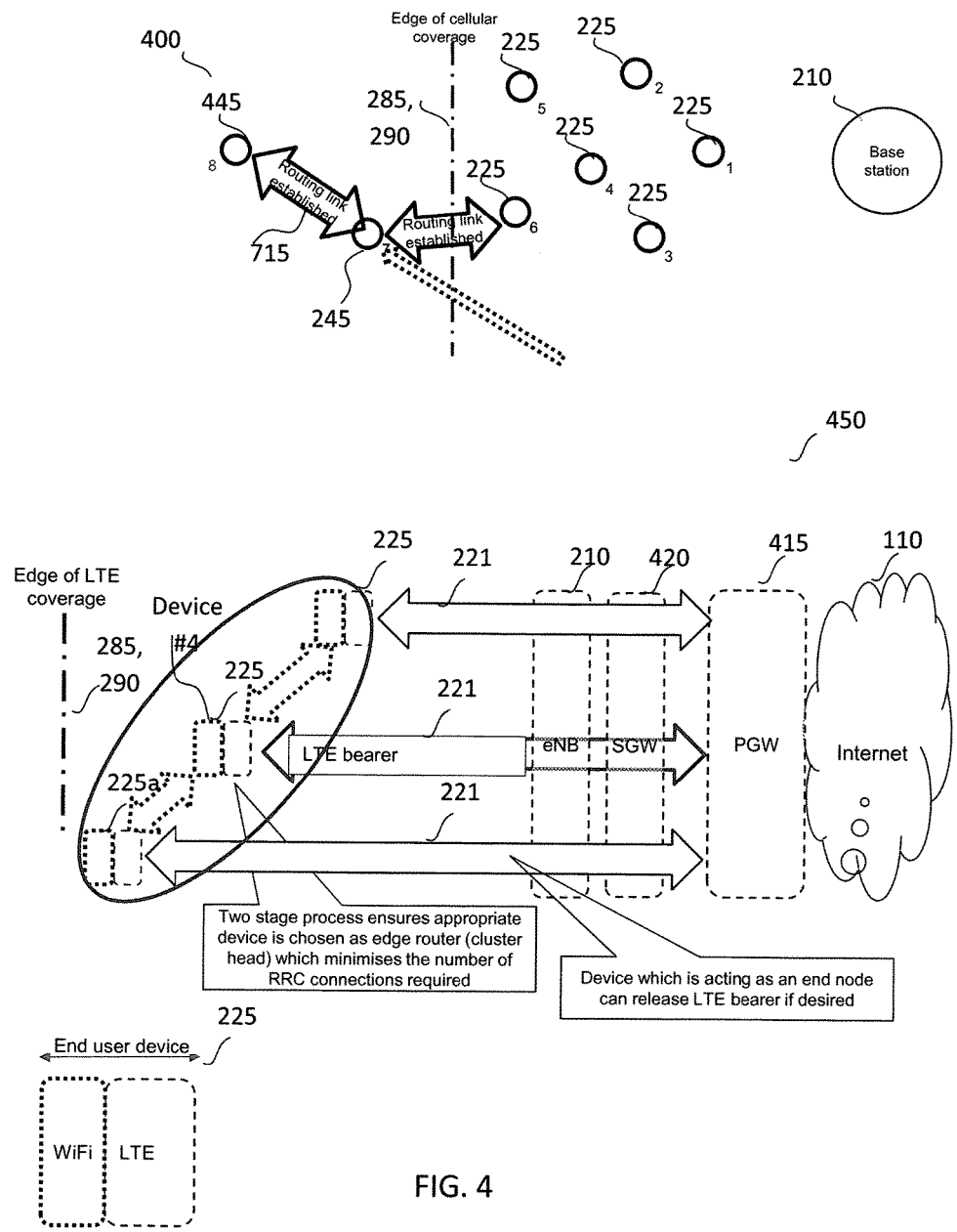
FIG. 4 illustrates an overview of a wireless communication system whereby a wireless communication unit may be configured as an edge router when located within a coverage area of a communication cell in accordance with some example embodiments of the present invention.

FIG. 4 illustrates a first overview of a wireless communication system 400, whereby a wireless communication unit 225 may be configured as an edge router when located within a coverage area of a communication cell, in accordance with some example embodiments of the present invention. In this example, all devices (e.g. wireless communication units 225) are located within the cellular coverage area of the base station 210, with the edge of the cellular coverage area being illustrated by dashed line 285, 290.

FIG. 4 illustrates an example where there are six wireless communication units 225 within coverage of a cellular technology. Device #1 is closest to the base station and thus is likely to have the highest rate cellular link to the base station. However, the radio technology used for mesh has a limited range such that if device #1 became the edge router then, say, only devices 2 and 3 could be relayed by it directly to the base station 210.

Device #4 has a poorer link quality to the base station but is within mesh transport technology range of all five other devices. Thus, in accordance with example embodiments, in order to minimise overall signalling device #4 may be selected as the designated edge router. In some examples, the selection of device #4 as the designated edge router is based on, at least in part, neighbour information.

FIG. 4 also shows a second overview of a wireless communication system 450, illustrating communications between wireless communication units 225. Each of the wireless communication units 225 are located within the communication cell coverage area, and thus able to communicate on an LTE™ bearer 221 with a packet gateway (PGW) 415 in the core network via eNodeB 210 and service gateway (SGW) 420. The PGW is connected to a public network, such as the Internet 110. Here the WiFi™ communication illustrated as a dotted line, represents lower range communication that is arranged to transpire between wireless communication units 225. The WiFi™ communication is able to be used to determine which wireless communication unit 225 is best suited to be identified as an edge router when located within a coverage area of a communication cell. One mechanism for deciding which node or wireless communication units 225 should become the edge router for the case where all devices are in-coverage is performed using a two-stage approach, as described in later flowcharts. The example mechanism may ensure that the appropriate node or wireless communication units 225 is selected as an edge router, such that a number of Radio Resource Control (RRC) connections that are required to provide support via that communication cell is reduced or minimized. Hence, in some optional examples, a processor in an appropriate node or one of the wireless communication units 225 configures the wireless remote communication unit as an edge router in response to processing the first messages and determining that the plurality of wireless remote communication unit require a minimum number of radio resource control connections. In this manner, it may be possible to minimize a number of RRC connections that are required for the ensemble of all wireless remote communication units in the network by optimally selecting the wireless communication unit (e.g. UE) to become an edge router.

Thus, in this in-coverage example, a single hop link to the wireless communication unit 225 configured as an edge router, marked as device #4 in the diagram, is illustrated. The text box shows that wireless communication unit 225a that is in-coverage of the LTE communication system can release a bearer connection, if desired, and maintain connectivity using the single hop to the wireless communication unit 225 configured as an edge router (e.g., device #4). In some examples, the wireless communication unit 225a may determine whether the mesh connectivity is acceptable, e.g. if the communication link exceeds a threshold for the wireless remote communication unit's traffic requirement, and release a bearer connection in response thereto, if desired. In some examples, the threshold may be associated with a current and/or future quality of service of data, a level of expected data in the future, etc.

In some examples, the selection of device #4 as the designated edge router is also based on, at least in part, a recognition that devices may be mobile, which means that their neighbour's communications will change over time. The inventor has recognized and appreciated that such moving devices are not likely to be good edge routers, not least because they will only give transitory support to other nodes that mesh into them. In one example, the selection of device #4 as the designated edge router based on, at least in part, a recognition that devices may be mobile and should not be primarily selected uses rounds of discovery. The results of the rounds of discovery are then compared to ascertain those devices that are typically not, or at least less, mobile. In examples, of the invention, any moving nodes that are in-coverage are allocated a low edge router rating so that they do not become edge routers, even if instantaneously they can see a large number of neighbours. Indeed, such moving nodes may be configured to avoid using edge routers as they should be configured to use the cellular connection to connect directly.

Once a device has been selected to operate as an edge router, the device, such as device #4, has to obtain another IP address that is indicative of an edge router. For example, in an IPv6 scenario, the edge router would always have the same IP address itself (which is also true for IPv4), but when the edge router detected that it was relaying to other nodes the edge router may perform 'prefix delegation' to obtain another prefix. This further prefix may then be used by other nodes to obtain their IPv6 addresses.

In some examples, the selection of device #4 as the designated edge router is also based on, at least in part, battery power of the device, as this will affect the device's ability to provide sufficient functionality to operate as an edge router. In some examples, the selection of device #4 as the designated edge router is also based on, at least in part, a link quality of a cellular connection between the device and its associated base station.

Out of Coverage Devices can Act as Mesh Routers

In one example, device #6 transitions its functionality to be an edge router, for example as it was mutually discovered by device #7 245 and turned on its edge router functionality. In this example, when a device is part of the mesh (the edge router and all other nodes within the mesh) will transmit a discovery message indicating that it is offering mesh functionality. Thus, device #7 245 is configured to transmit discovery messages that indicate that it offers mesh connectivity. For example, if device #7 245 is subsequently discovered by device #8 445 then it can route traffic from/to device #8 445 to the edge router functionality provided by device #6 225 in a multi-hop manner. In one example, based on limitations of multi-hop functionality, devices that are in-coverage and that are also connected via mesh functionality to the edge router will not transmit discovery messages, unlike those out-of-coverage. Such an example scenario results in a system that supports a single hop communication link for in-coverage devices and multi-hop communication links for out-of-coverage devices.

Device Moves from being in-Coverage to Out-of-Coverage

In one example, if device #7 was acting as an edge router and moves out of coverage, it cannot continue to act as an edge router. It must therefore stop forwarding data received on the mesh to the base station via the cellular connectivity, as it is no longer connected to the base station. Furthermore, device #7 must stop sending router advertisements to mesh routers and end nodes. In addition, device #7 must stop sending discovery messages indicating that it can provide mesh connectivity. As such, device #7 must then function as an out of coverage device 245. In one example, device #7 245 may then transition to function as a mesh router to route communications between device #8 445 and in-coverage device #6 225 that is functioning as an edge router. In this further example, the wireless communication unit may provide a mesh router service to multiple other out-of-coverage devices in a multi-hop manner.

Choice of Edge Router when Some Devices Out of Cellular Coverage

Unlike the case in FIG. 4, where all devices are in-coverage and have the option of connecting to the base station directly, devices such as device 245 from FIG. 2 that are located outside of cellular coverage have no choice but to use mesh technology via an edge router. It is therefore important that devices that are in-coverage offer edge router functionality to out of coverage devices. For example, and referring back to FIG. 4, even though device #6 can only see two devices or nodes (e.g. device #4 and let's assume device 245 that is out-of-coverage), with device #4 being an edge router itself, it is important that device #6 becomes an edge router itself to provide device 245 in FIG. 2 with connectivity.

In one example, device 245 may indicate in a flag that it is out of cellular coverage. In one example, any other (in-coverage) device that can see device 245 may switch on its edge router functionality by starting to transmit active mesh beacons. In the context of examples of the invention, an active mesh beacon encompasses beacon transmissions associated with the mesh connectivity. For example, the service set identifier (SSID) and broadcast service set identifier (BSSID) for a WiFi™ mesh network implementation could indicate an active mesh network providing connectivity. In some examples, it is envisaged that the active mesh beacons may also include channel quality information at the node B, for the edge router to use. In some examples, it is also envisaged that the battery power of the edge router may also be provided. In this manner, if a device is able to listen to multiple active mesh beacons, potential end nodes could select one mesh over another mesh based on this info, e.g. if a device is able to listen to two active mesh beacons, it can decide to join with the one that says it has the best channel quality to the cellular base station.

Device 245 would then see the active mesh beacons from device #6 (and perhaps other in-coverage devices that have seen the original discovery message from device 245 and that have also switched on their edge router functionality). Device 245 would then select the best of these devices based on the received beacon power of the active mesh beacons that were transmitted.

Figure 6:
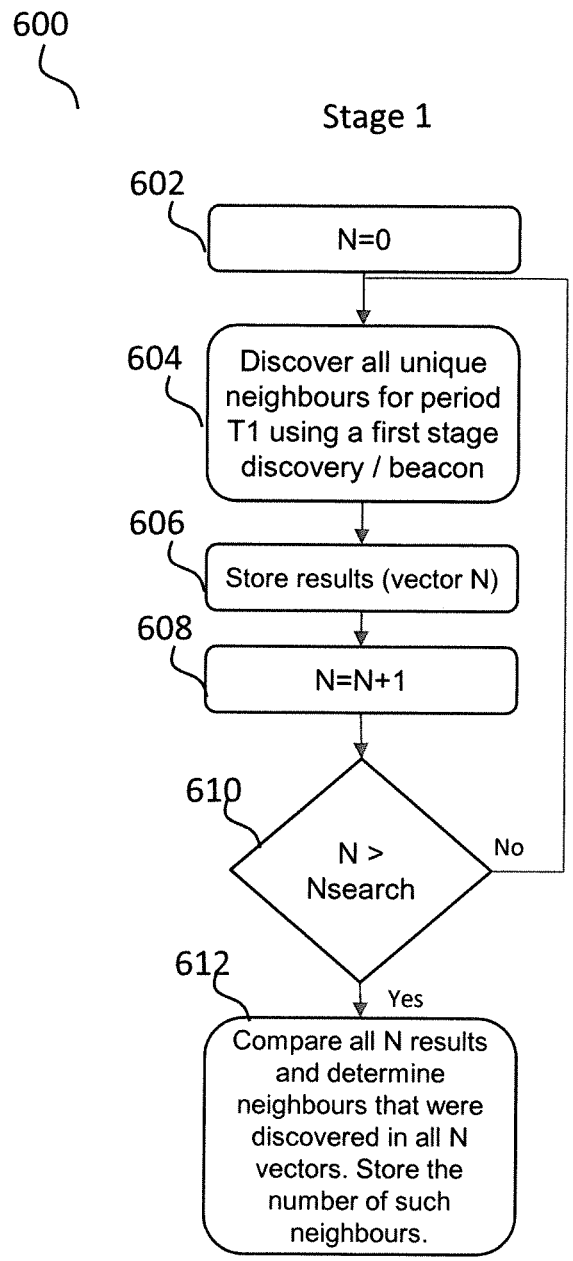
FIG. 6 illustrates a flowchart of a (first stage) process for selecting a wireless communication unit as an edge router in a wireless communication system in accordance with some example embodiments of the present invention.

In one example, and referring to FIG. 6, a modification to account for this feature is that the discovery messages in 604 may also contain an indication of whether the device is in-coverage. Thus, when device #6 and device 245 exchange discovery information, device #6 discovers that it is a neighbour of an out-of-coverage device during the first stage 600. In this situation, device #6 may then remove itself from the voting process of the second stage and immediately turn on edge router functionality.

Figure 5:
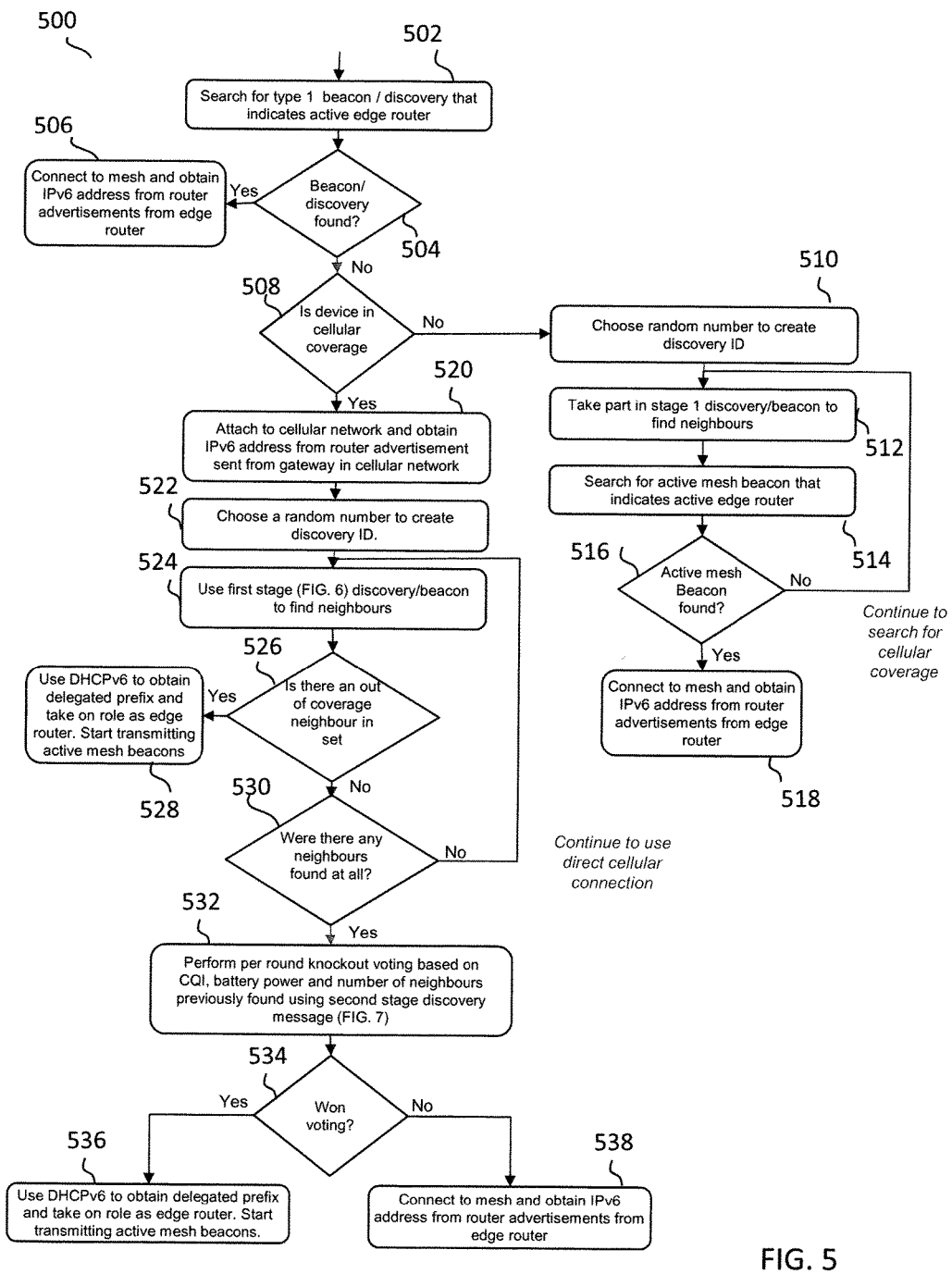
FIG. 5 illustrates an example flowchart of a wireless communication unit to decide mesh functionality in accordance with some example embodiments of the present invention.

Thus, and turning to FIG. 5, an example flowchart 500 of a wireless communication unit configured to decide mesh functionality, in accordance with some example embodiments of the present invention, is shown.

In 502, device 245 searches for, say, active mesh beacons from another device that indicates that it is functioning (or capable as functioning) as an active edge router. If such another device, such as device #6 225 from FIG. 4, is found in 504, device 245 connected to device #6 225 and thereby forms a mesh network. An IPv6 address is obtained from router advertisements from device #6 225 configured to operate as the edge router in 506.

If no active mesh beacons are found from another device in 504, the device, e.g. device 245, determines whether it is within cellular coverage in 508. If the device, e.g. device 245, determines that it is not within cellular coverage in 508, it chooses a random number to create its own discovery ID, as clarified before, in 510. The device then takes part in a first stage discovery process to locate neighbours in 512, in FIG. 5. The device also continues to search for an active mesh beacon that indicates that it is within coverage, e.g. WiFi™ coverage, of an active edge router in 514. In some examples, should the device receive a stage 1 discovery beacon, and if this indicates 'in-coverage', then the in-coverage device may also switch on its mesh functionality (as in 528) and start transmitting an active mesh beacon, which will be received by this device and end up at 518.

If a suitable active mesh beacon is not found in 516, the device continues to search for cellular coverage, either direct (not shown) or via an active edge router in 514 or to discover a neighbour that could provide mesh coverage 512. If a suitable active mesh beacon is found in 516, the device connects to the device transmitting the active mesh beacon, for example device #6 225, and thereby forms a mesh network. An IPv6 address is obtained from router advertisements from device #6 225 configured to operate as the edge router in 518.

If the device, e.g. device 245, determines that it is within cellular coverage in 508, for example it has moved to effectively become an in-coverage device 225 it connects to the cellular network and obtains an IPv6 address from router advertisements sent from a gateway in the cellular core network. The device (now an in-coverage device 225) chooses a random number to create its own discovery ID, as clarified before, in 522. The device then takes part in a first stage discovery process (as described in FIG. 5) in order to locate neighbours in 524. If the in-coverage device 225 determines in 526 that it is connectable to an out-of-coverage device, the (now) in-coverage device 225 uses DHCPv6 to obtain a delegated prefix and re-configures itself to act as an edge router in 528. The (now) in-coverage device 225 then starts transmitting active mesh beacons.

If the (now) in-coverage device 225 determines in 526 that it is not connectable to an out-of-coverage device, the (now) in-coverage device 225 determines whether any neighbour devices at all were found in 530. If no neighbour devices at all were found in 530, the (now) in-coverage device 225 loops back to 524, i.e. continues to search for any neighbours. However, if the (now) in-coverage device 225 determines that one or more neighbour devices were found in 530, it commences the second stage operation of FIG. 5. In particular, the (now) in-coverage device 225 performs a per round knock-out voting process with any identified other devices in 532. In some examples, the knock-out voting process may be based on one or more of: CQI, battery power, number of neighbours using a second stage discovery, etc. For example, an a priori empiric function is performed by both devices to determine, say, a single quality parameter from the parameter(s) communicated The result of both devices performing the a priori empiric function is that the one device with the higher quality metric will be the 'winner' in 534. In one example, the loser will stop taking part in the stage 2 voting process, i.e. stop transmitting stage 2 discovery messages. It is envisaged that in some examples, the devices may transmit the result(s) to each other in order to confirm the 'winner' and/or 'loser'. Although only one iteration of the voting process is shown, it is envisaged that multiple voting rounds may be performed, with each round specifying a 'winner'. In this manner, an optimum device will be selected. In one example, whichever device is still transmitting the stage 2 discovery messages when a timer (such as T2 timer in FIG. 7) expires will be declared the overall winner.

In 536, the overall winner will use DHCPv6 to obtain a delegated prefix from the cellular network, which it may send, for example, in ICMPv6 router advertisements and take on the role of an edge router. If the device did not win the voting process in 534, the device connects to the mesh network that will subsequently become active due to the actions of the winner and obtains an IPv6 address from router advertisements from the edge router in 538.

FIG. 6 illustrates a flowchart 600 of a first stage of a process for selecting a wireless communication unit as an edge router in a wireless communication system in accordance with some example embodiments of the present invention. For example, the flowchart 600 of a first stage of a process for selecting a wireless communication unit as an edge router may be employed in the operation at 524 in FIG. 5. In the first stage, a number of unique consistently observed neighbours' needs to be found. For example, referring back to FIG. 4, this process will identify wireless communication unit #4, as the selected candidate edge router, as all other wireless communication units will have fewer numbers of neighbours that they are able to communicate with on a WiFi™ connection. It is envisaged that in other examples, other mesh interconnect technology may be used, for example Bluetooth™ 802.15.4, etc. First a counter 'N' is set to zero, in 602. In one example, a discovery Identity may be selected by each wireless communication unit. For example, a discovery Identity may be selected from a random value of a large number space (say a 32 bit number). The larger the number space, the less there is a chance of two devices picking the same value, as illustrated at 522 in FIG. 5.

Next, in 604, a discovery operation is performed. In one example, the discovery operation is performed by each wireless communication unit transmitting its own discovery messages (e.g. a first stage discovery beacon) and looking to receive discovery messages from other devices. In some examples, this discovery operation is performed for a limited period of time (e.g. T1). In some examples, the discovery messages may include the discovery identity of the transmitting wireless communication unit in order to exchange information between discovered devices. In some examples, each wireless communication unit records the details of the discovery ID of all discovered devices. In one example, when the timer T1 has expired, each wireless communication unit records all the unique devices that it discovered (e.g. it records all the different discover IDs that have been found), stores these in a vector and labels it with the iteration number, in 606.

A determination is then made in 610 as to whether the iterations have finished. If it is determined that the iterations have not finished, e.g. the counter has not been reached, this process is repeated for a number of iterations, $N_{search}$. However, if it is determined that the iterations have finished in 610, each wireless communication unit looks at the contents of the $N_{search}$ vectors (stored in 606) and determines the number of neighbour devices (identified by their discovery ID) that occur in all of the N vectors. This provides the number of unique consistently observed neighbours.

Figure 7:
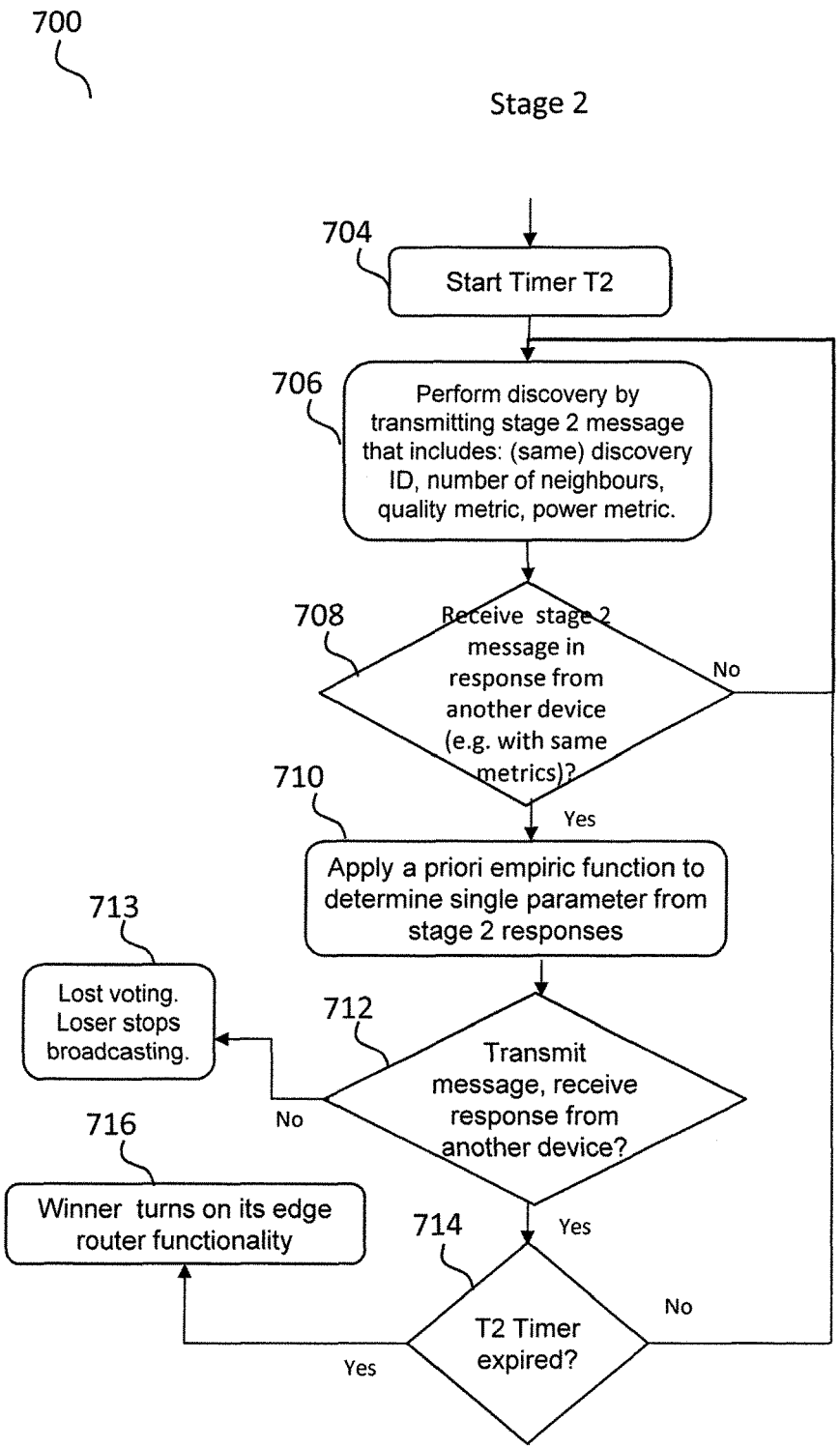
FIG. 7 illustrates a flowchart of a (second stage) process for selecting a wireless communication unit as an edge router in a wireless communication system in accordance with some example embodiments of the present invention.

FIG. 7 illustrates a flowchart 700 of a second stage of a process for selecting a wireless communication unit as an edge router in a wireless communication system in accordance with some example embodiments of the present invention. For example, the flowchart 700 of a second stage of a process for selecting a wireless communication unit as an edge router may be employed in the operation at 532 in FIG. 5, following the wireless communication unit having already found neighbours.

However, if at least one neighbour was found in 702, the process moves to 704 where a second timer (T2) is started. Thereafter, discovery is performed in 706. However, this time, a new second stage discovery message format is used. In one example, the new second stage discovery message includes one or more of: the (same) discovery ID, the number of unique consistently observed neighbours (from 612), and a quality metric, e.g. a channel quality indicator (CQI) metric for the cellular network or a base station beacon level, for example, and a battery/power availability metric (important for 102 devices). In 708, a determination is made as to whether the device has received a second stage response from another device with its metric(s). If no response has been received in 708, the process loops to 706.

If at least one report with the same metrics has been received in 708, a voting operation is performed by (at least) both devices. For example, in 710, an a priori empiric function is performed by both devices to determine, say, a single quality parameter from the second stage message parameter(s) communicated in 706. In some examples, it is envisaged that a voting message may include channel quality information at the node B. In some examples, it is also envisaged that the battery power of the edge router may also be provided.

The result of both devices performing the a priori empiric function is that the one device with the higher quality metric will be declared the 'winner' of that particular voting operation. In one example, in a broadcast-based transmission approach, the 'winner' of that particular voting operation may continue to transmit second stage discovery messages (e.g. of the form described in 706) and receive responses, for example from other devices, as in 712. In some examples, this may involve a number of voting rounds similar to that defined in 706, 708, 710. In contrast, the 'loser' may just stop broadcasting or sending discovery messages, as in 713. In an alternative example, in a discovery-based transmission approach, the devices may transmit the result(s) to each other in order to confirm the 'winner' and/or 'loser'.

A determination is made in 714 as to whether the second timer (T2) has expired. If the second timer (T2) has not expired in 714 the process loops to 706. However, if the second timer (T2) has expired in 714 the winning device shall turn on its edge router functionality in 716 to start an active mesh by starting to transmit active mesh beacons and stop transmitting the stage 2 discovery messages. In some examples, this 'winning' device may also use DHCPv6 to obtain a delegated prefix from the network, which it may send, for example, in ICMPv6 router advertisements.

Advantageously, by making a measurement of consistently observed neighbours, moving UEs will not be selected as edge routers.

Thus, in some examples, a number of new messages may be used to find neighbours. As previously indicated, a first new message may be in a form of an active mesh beacons are described that are used to identify a device as an edge router. In some examples, this new beacon may comprise information about the mesh network that it is supporting. In some examples, this may use simple broadcast messages, for step 532 in FIG. 5.

Figure 8:
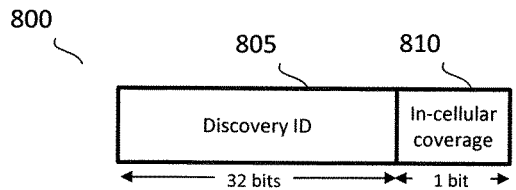
FIG. 8 illustrates an example message format to be used in the flowchart of a (first stage) process for selecting a wireless communication unit as an edge router in a wireless communication system of FIG. 6 in accordance with some example embodiments of the present invention.

Referring now to FIG. 8, an example second message format 800 is illustrated that may be used in the flowchart of a (first stage) process for selecting a wireless communication unit as an edge router in FIG. 6, as well as step 524 in FIG. 5, in accordance with some example embodiments of the present invention. The example second message format 800 comprises, in this example at least, a discovery identifier (ID) 805, and a flag 810 indicating whether the device is in-coverage or out-of-cellular coverage. The example second message format 800 may be employed in a (first stage) active discovery operation with additionally an indication that the device is in the stage described to find neighbours. Although the example second message format 800 illustrates a discovery ID 805 of 32 bits, and a flag 810 of 1 bit, it is envisaged that other field sizes may equally be used, for example based on the number of devices or wireless technology, etc.

Figure 9:
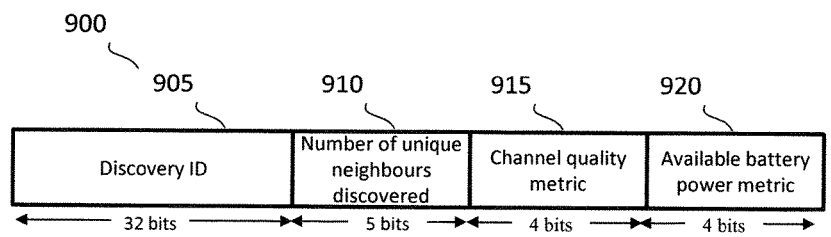
FIG. 9 illustrates an example message format to be used in the flowchart of a (second stage) process for selecting a wireless communication unit as an edge router in a wireless communication system of FIG. 7 in accordance with some example embodiments of the present invention.

Referring now to FIG. 9, illustrates an example third message format 900, which may be used in the flowchart of FIG. 7, as well as step 532 in FIG. 5, for a (second stage) process for selecting a wireless communication unit as an edge router, in accordance with some example embodiments of the present invention. The example third message format 900 may be used to perform voting in order to determine which device should be the edge router. The example third message format 900 comprises, in this example at least, one or more of: (a) an indication that the third message relates to voting indication, (b) discovery ID 905, (c) a number of unique neighbours discovered 910, (d) one or more channel quality indicator(s) (CQI) or other cellular quality metric 915, (d) battery power indication 920. Although the example third message format 900 illustrates a discovery ID 905 of 32 bits, a number of unique neighbours discovered 910 of 5 bits, one or more CQIs 915 of 4 bits, and battery power indication 920 of 4 bits it is envisaged that other field sizes may equally be used, for example based on the number of devices or wireless technology, etc.

In Coverage Devices have Choice of Connectivity

Figure 10:
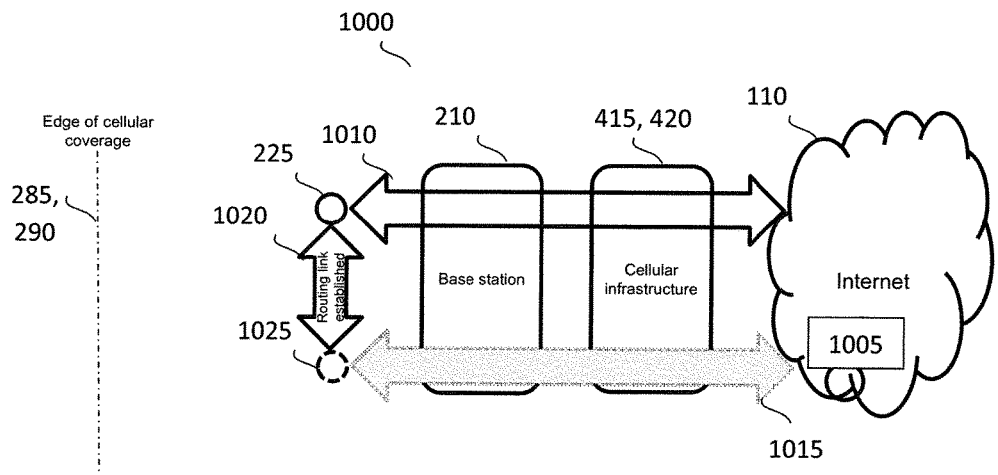
FIG. 10 illustrates an overview of a wireless communication system whereby a wireless communication unit within a coverage area of a communication cell is configured with connectivity options to the Internet in accordance with some example embodiments of the present invention.

Referring now to FIG. 10, an overview of a wireless communication system is illustrated whereby a wireless communication unit within a coverage area of a communication cell is configured with connectivity options to the Internet, for example a decision is needed between using cellular coverage and a single hop in-coverage communication link, in accordance with some example embodiments of the present invention. FIG. 10 shows the case of an in-coverage device 1025 configured to act as an end node, but also relayed via an edge router to the Internet 110. The cellular link between the device and the Internet 110 is showed greyed out because although it may or may not be active the device could establish it if necessary.

In this scenario, two routes for high or low priority traffic exist for the in-coverage device 225. For example, wireless communication unit 1025 may have previously established a cellular bearer to the cellular network and have a NAS context in the MME, but may now be in an RRC idle mode. Therefore, a context in the cellular infrastructure exists but there is no radio bearer active. Under these conditions the device 1025 acting as end node has two IPv6 addresses, so can choose to select one route or the other depending on the priority and type of traffic. For instance, for high priority traffic, wireless communication unit 1025 may decide that is better to use the direct cellular path (that would entail obtaining a RRC connection in the cellular network and sending data along this path). For lower priority traffic, the mesh connectivity path via another in coverage node acting as an edge router would be more appropriate. Thus, in some examples, a simple quality of service (QoS) priority test may be conducted to determine the best route.

IP addresses in LTE™ are usually provided by the PDN gateway 415, or a separate external DHCP server. The first address is associated with the direct connection 1015 through the cellular network, i.e. router advertisements that are transmitted over transport links sent directly through the cellular infrastructure. The second address is obtained via router advertisements sent from the edge router device 225.

Thus, it is possible for device 1025 to choose the route that data is sent to the internet. A first route follows from establishing an RRC connection to the cellular network (if not currently established) and sending data directly (using the IP address obtained from router advertisements sent from the network, typically from a PGW in LTE case, but could be from other functionality outside of the EPC. Using this first option is likely to provide a lower latency connection, although may cost more power and signalling overhead. Thus, the type of traffic will influence the decision to use one or other route (and associated IP address).

A second option is to use the mesh connectivity 1020, to a local edge router device 225 and send data via this device using the IP address obtained from the router advertisements sent from the edge router device 225.

In order to support two routing options, application server 1005 resides within the internet 110 in order to recognise that device 1025 can be reachable via two addresses. In one example, application server 1005 may similarly recognise that it should use one address, say associated with mesh functionality, for low priority, high delay tolerant data (via mesh router 225) and the other address, associated with direct connection 1015, for high priority, low delay tolerant data. In this example, device 1025 would need to register both addresses with the application server 1005. In this manner, device 1025 may ultimately decide to discontinue the direct link 1015 if the communication link 1020, 1010 with mesh connection via edge router 225 is acceptable.

It should be noted that to maintain a context within the evolved packet core (EPC) of an LTE™ system (even when without there being an RRC_connection, i.e. the device is performing idle mode functionality), the device is required to perform periodic tracking area updates (TAU) and periodically listen for paging messages, which costs energy. Thus devices that wish to preserve even more power can lose their EPC context (i.e. go from evolved packet system mobility management (EMM) registered mode to EMM deregistered mode) by stopping sending TAU.

Device Moves from Out-of-Coverage to in-Coverage

Figure 11:
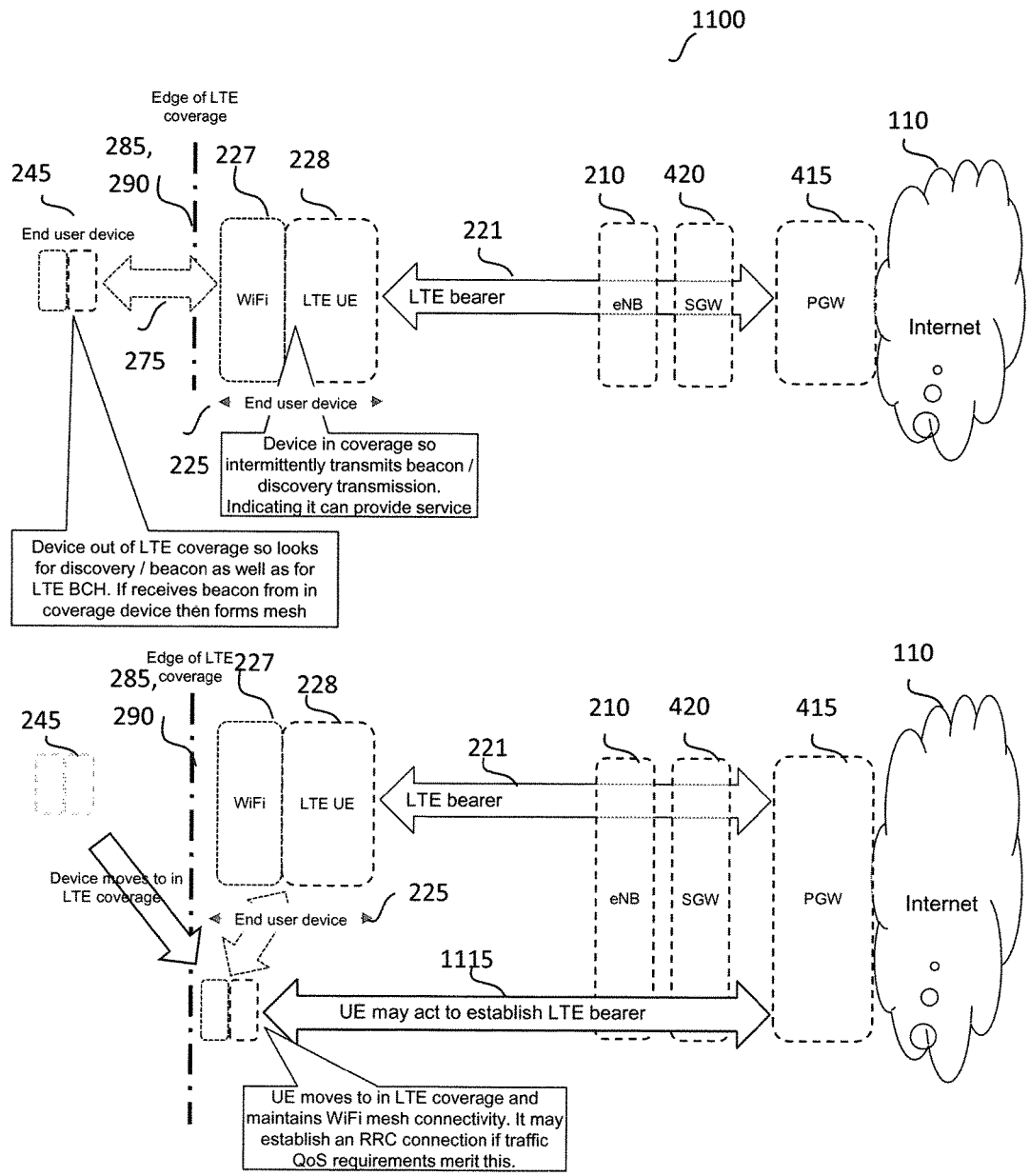
FIG. 11 illustrates an overview of a wireless communication system whereby a wireless communication unit enters a coverage area of a communication cell and is configured to perform a different role in accordance with some example embodiments of the present invention.

Referring now to FIG. 11, an overview of a wireless communication system 1100 is illustrated whereby a wireless communication unit enters a coverage area of a communication cell and is configured to perform a different role in accordance with some example embodiments of the present invention. Each of the wireless communication units 225 are located within the communication cell coverage area, and thus able to communicate on an LTE™ bearer 221 with a packet gateway (PGW) 415 in the core network via eNodeB 210 and service gateway (SGW) 420. The PGW 415 is connected to a public network, such as the Internet 110. Here the WiFi™ communication illustrated as a dotted line, represents lower range communication that is arranged to transpire between wireless communication units 225. It is envisaged that in other examples that the mesh connectivity could use additional or alternative technologies, such as Bluetooth™ or 802.15.4, for example. Thus, LTE™ provides the wide area network coverage and WiFi™ is used for mesh connectivity between devices. The WiFi™ communication is able to be used to determine which wireless communication unit 225 is best suited to be identified as an edge router when located within a coverage area of a communication cell.

FIG. 11 shows another device 245 that is out of cellular coverage. Hence, device 245 looks for discovery messages or beacons, as well as LTE™ broadcast channels (BCH). Thus, when out-of-cellular coverage, device 245 attempts to listen to two separate technologies: (i) to determine when it is within range of a dual-mode UE/edge router transmitting discoverable beacons, as well as (ii) attempting to listen to the cellular network to find out whether it has moved within coverage of the cellular network. If device 245 receives a beacon from an in-coverage device, it forms a mesh network.

As illustrated, if out-of-coverage device 245 moves within coverage of the cellular network, i.e. within range of transmissions from eNodeB 210, the device may maintain WiFi™ mesh communication with the edge router device 225. Additionally or alternatively, device 245 may establish an RRC connection with the cellular network direct on 1115, for example if traffic quality of service (QoS) requirements merit this. Thus, the device 245 may be in a position to select from the two options as to how it receives Internet connectivity. If the device 245 was not within a mesh (i.e. it had no connectivity at all) then it should start from the top of the flowchart described in FIG. 5. In some examples, if the mesh connectivity QoS is acceptable, then device 245 may stop even searching for cellular coverage, thereby saving further battery power by not perform these measurements.

In some examples, it is envisaged that the active mesh beacons may also include channel quality information at the node B, for the edge router to use. In some examples, it is also envisaged that maybe the battery power of the edge router may also be provided. In this manner, if a device is able to listen to multiple active mesh beacons, potential end nodes could select one mesh over another mesh based on this info, e.g. if a device is able to listen to two active mesh beacons, it can decide to join with the one that says it has the best channel quality to the cellular base station.

Figure 12:
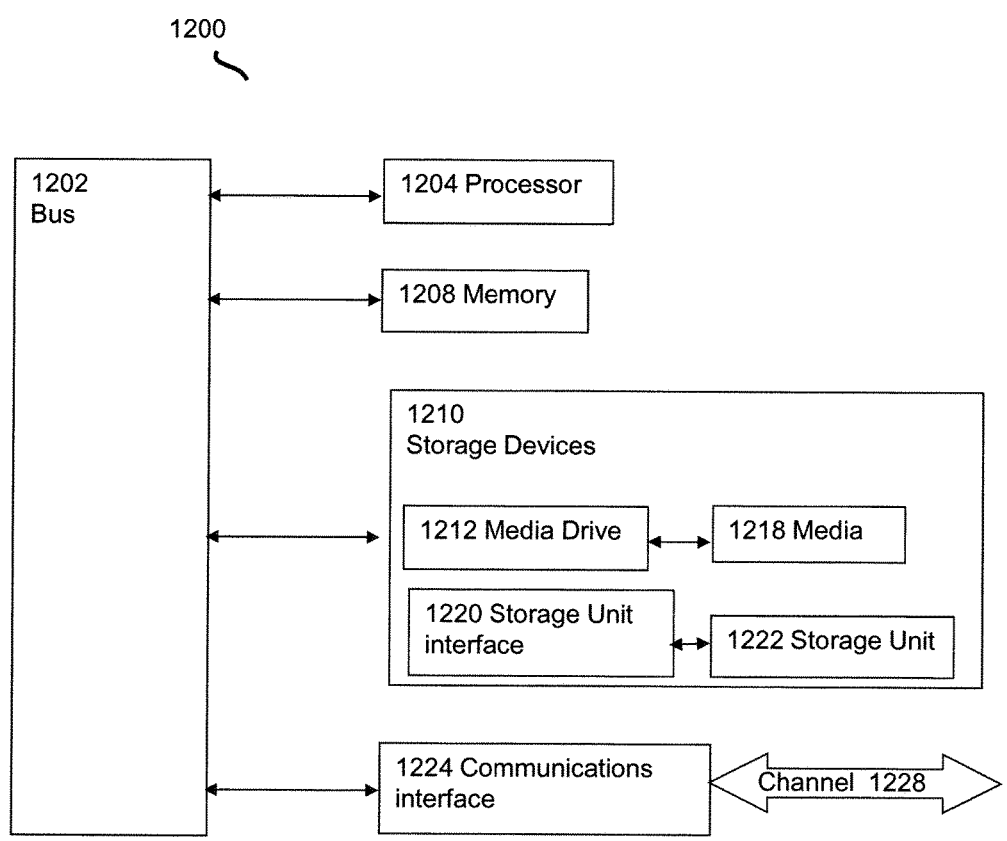
FIG. 12 illustrates a typical computing system that may be employed a wireless communication unit to perform an enforcement role in accordance with some example embodiments of the invention.

Referring now to FIG. 12, there is illustrated a typical computing system 1200 that may be employed to implement software controlled switching between a first mode of operation where a backhaul link may be available and a second mode of operation where a backhaul link may not be available in some example embodiments of the invention. Computing systems of this type may be used in wireless communication units. Those skilled in the relevant art will also recognize how to implement the invention using other computer systems or architectures. Computing system 1200 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1200 can include one or more processors, such as a processor 1204. Processor 1204 can be implemented using a general or special-purpose processing engine such as, for example, a microprocessor, microcontroller or other control logic. In this example, processor 1204 is connected to a bus 1202 or other communications medium.

Computing system 1200 can also include a main memory 1208, such as random access memory (RAM) or other dynamic memory, for storing information and instructions to be executed by processor 1204. Main memory 1208 also may be used for storing temporary variables or other intermediate information during execution of instructions to be executed by processor 1204. Computing system 1200 may likewise include a read only memory (ROM) or other static storage device coupled to bus 1202 for storing static information and instructions for processor 1204.

The computing system 1200 may also include information storage system 1210, which may include, for example, a media drive 1212 and a removable storage interface 1220. The media drive 1212 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1218 may include, for example, a hard disk, floppy disk, magnetic tape, optical disk, CD or DVD, or other fixed or removable medium that is read by and written to by media drive 1212. As these examples illustrate, the storage media 1218 may include a computer-readable storage medium having particular computer software or data stored therein.

In alternative embodiments, information storage system 1210 may include other similar components for allowing computer programs or other instructions or data to be loaded into computing system 1200. Such components may include, for example, a removable storage unit 1222 and an interface 1220, such as a program cartridge and cartridge interface, a removable memory (for example, a flash memory or other removable memory module) and memory slot, and other removable storage units 1222 and interfaces 1220 that allow software and data to be transferred from the removable storage unit 1218 to computing system 1200.

Computing system 1200 can also include a communications interface 1224. Communications interface 1224 can be used to allow software and data to be transferred between computing system 1200 and external devices. Examples of communications interface 1224 can include a modem, a network interface (such as an Ethernet or other NIC card), a communications port (such as for example, a universal serial bus (USB) port), a PCMCIA slot and card, etc. Software and data transferred via communications interface 1224 are in the form of signals which can be electronic, electromagnetic, and optical or other signals capable of being received by communications interface 1224. These signals are provided to communications interface 1224 via a channel 1228. This channel 1228 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 1208, storage device 1218, or storage unit 1222. These and other forms of computer-readable media may store one or more instructions for use by processor 1204, to cause the processor to perform specified operations. Such instructions, generally referred to as 'computer program code' (which may be grouped in the form of computer programs or other groupings), when executed, enable the computing system 1200 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1200 using, for example, removable storage drive 1222, drive 1212 or communications interface 1224. The control logic (in this example, software instructions or computer program code), when executed by the processor 1204, causes the processor 1204 to perform the functions of the invention as described herein.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

In one example, non-transitory tangible computer program product comprising executable code stored therein may be used for selecting a wireless remote communication unit for configuration as an edge router in a wireless communication system that comprises multiple wireless remote communication units. The executable program code may be operable for, when executed at the remote wireless communication unit: communicating with at least one other wireless remote communication unit using a first technology; communicating with a cellular network node using a second technology; processing received first messages from at least one other wireless remote communication unit; and configuring the wireless remote communication unit as an edge router to support mesh network communications using the first technology based on, at least in part, information obtained from the processed received first messages.

In one example, non-transitory tangible computer program product comprising executable code stored therein may be used for selecting an internet protocol, IP, address, for an application server that is coupleable to a wireless communication system that comprises multiple wireless remote communication units. The executable program code may be operable for, when executed at the application server comprising: storing internet protocol, IP, addresses for the multiple wireless remote communication units, wherein at least one wireless remote communication unit is assigned multiple IP addresses; selecting one IP address from the multiple IP addresses based on the different data types of communication that the at least one wireless remote communication unit wishes to support; and instructing the at least one wireless remote communication unit to use the selected one IP address.

In one example, non-transitory tangible computer program product comprising executable code stored therein may be used for selecting internet connectivity. The executable program code may be operable for, when executed at a wireless remote communication unit: communicating with a cellular network node using either a first technology employed with mesh connectivity via at least one other wireless remote communication unit or a second technology employed with a direct connection; and selecting internet connectivity for communication using either: a first internet protocol, IP, address associated with mesh functionality to route low priority, high delay tolerant data via an edge router and the cellular network node; or a second IP address associated with direct connection to the cellular network node for high priority, low delay tolerant data.

In one example, non-transitory tangible computer program product comprising executable code stored therein may be used for configuring a wireless remote communication unit with mesh router functionality. The executable program code may be operable for, when executed at the wireless remote communication unit: communicating with a cellular network node using either a first technology employed with mesh connectivity via at least one other wireless remote communication unit or a second technology employed with a direct connection; receiving first messages using the first technology employed with mesh connectivity from at least one other wireless remote communication unit; determining when the wireless remote communication unit moves out of coverage of the cellular network node and, in response thereto, configuring the wireless remote communication unit with mesh router functionality that transfers data from one node to another node within a mesh network using the first technology based on, at least in part, information obtained from the received first messages.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

In a first example of an integrated circuit, the integrated circuit may be suitable for a wireless remote communication unit for communicating with a cellular network node and other wireless remote communication units. In this first example, the integrated circuit comprises: at least one receiver port configured to receive first messages using a first technology from at least one other wireless remote communication unit and configured to receive second messages using a second technology from the cellular network node; at least one transmitter port configured to transmit first messages using the first technology to at least one other wireless remote communication unit and configured to transmit using the second technology to the cellular network node; and a processor coupled to the at least one receiver port and the at least one transmitter port and arranged to configure the wireless remote communication unit as an edge router to support mesh network communications using the first technology based on, at least in part, information obtained from the received first messages from at least one other wireless remote communication unit.

In a second example of an integrated circuit, the integrated circuit may be suitable for an application server coupleable to a wireless communication system that comprises multiple wireless remote communication units. In this second example, the integrated circuit comprises: a memory operably configured to store internet protocol (IP) addresses for the multiple wireless remote communication units, wherein at least one wireless remote communication unit is assigned multiple IP addresses; a processor, operably coupled to the memory, and configured to select one IP address from the multiple IP addresses based on the different data types of communication that the at least one wireless remote communication unit wishes to support; and a transmitter configured to instruct the at least one wireless remote communication unit to use the selected one IP address.

In a third example of an integrated circuit, the integrated circuit may be suitable for a wireless remote communication unit. In this third example, the integrated circuit comprises: at least one transceiver port configured to communicate with a cellular network node using either a first technology employed with mesh connectivity via at least one other wireless remote communication unit or a second technology employed with a direct connection; and a processor coupled to the at least one transceiver port and configured to select internet connectivity using either: a first internet protocol, IP, address associated with mesh functionality to route low priority, high delay tolerant data via an edge router and the cellular network node; or a second IP address associated with direct connection to the cellular network node for high priority, low delay tolerant data.

In a fourth example of an integrated circuit, the integrated circuit may be suitable for a wireless remote communication unit. In this fourth example, the integrated circuit comprises: at least one transceiver port configured to communicate with a cellular network node using either a first technology employed with mesh connectivity via at least one other wireless remote communication unit or a second technology employed with a direct connection; and a processor coupled to the at least one transceiver port and arranged to determine when the wireless remote communication unit moves out of coverage of the cellular network node and, in response thereto, configure the wireless remote communication unit with mesh router functionality that transfers data from one node to another node within a mesh network using the first technology based on, at least in part, information obtained from received first messages using the first technology employed with mesh connectivity from at least one other wireless remote communication unit.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A wireless remote communication unit comprising:
   at least one transceiver configured to communicate with a cellular network node using either a first technology employed with mesh connectivity via at least one other wireless remote communication unit or a second technology employed with a direct connection to the cellular network node; and
   a processor coupled to the at least one transceiver and configured to:
   determine whether the mesh connectivity exceeds a threshold for a traffic requirement of the wireless remote communication unit;
   release, in response thereto, a direct connection to the cellular network node; and
   select internet connectivity using a first internet protocol, IP, address associated with mesh functionality to route low priority, high delay tolerant data via both the cellular network node and the at least one other wireless remote communication unit configured as an edge router coupled to the cellular network node.

2. An integrated circuit for a wireless remote communication unit, the integrated circuit comprising:
   at least one transceiver port configured to communicate with a cellular network node using either a first technology employed with mesh connectivity via at least one other wireless remote communication unit or a second technology employed with a direct connection; and
   a processor coupled to the at least one transceiver port and configured to:
   determine whether the mesh connectivity exceeds a threshold for a traffic requirement of the wireless remote communication unit;
   release, in response thereto, a direct connection to the cellular network node; and
   select internet connectivity using a first internet protocol, IP, address associated with mesh functionality to route low priority, high delay tolerant data via both the cellular network node and the at least one other wireless remote communication unit configured as an edge router coupled to the cellular network node.

3. A method for a wireless remote communication unit, the method comprising:
   communicating with a cellular network node using either a first technology employed with mesh connectivity via at least one other wireless remote communication unit or a second technology employed with a direct connection;
   determining whether the mesh connectivity exceeds a threshold for the wireless remote communication unit's traffic requirement; and in response thereto,
   releasing a direct connection to the cellular network node, and
   selecting internet connectivity for communication using a first internet protocol, IP, address associated with mesh functionality to route low priority, high delay tolerant data via both the cellular network node and the at least one other wireless remote communication unit configured as an edge router coupled to the cellular network node.

4. A non-transitory tangible computer program product comprising executable code stored therein for selecting internet connectivity, wherein the code is operable for, when executed at a wireless remote communication unit enable the wireless remote communication unit to perform:
   communicating with a cellular network node using either a first technology employed with mesh connectivity via at least one other wireless remote communication unit or a second technology employed with a direct connection;
   determining whether the mesh connectivity exceeds a threshold for the wireless remote communication unit's traffic requirement; and in response thereto,
   releasing a direct connection to the cellular network node, and
   selecting internet connectivity for communication using a first internet protocol, IP, address associated with mesh functionality to route low priority, high delay tolerant data via both the cellular network node and the at least one other wireless remote communication unit configured as an edge router coupled to the cellular network node.

5. A wireless communication system comprising:
   at least one cellular network node; and
   multiple wireless remote communication units operably connectable to the at least one cellular network node; wherein a wireless remote communication unit comprises:
   at least one transceiver configured to communicate with a cellular network node using either a first technology employed with mesh connectivity via at least one other wireless remote communication unit or a second technology employed with a direct connection; and
   a processor coupled to the at least one transceiver and configured to:
   determine whether the mesh connectivity exceeds a threshold for a traffic requirement of the wireless remote communication unit;
   release, in response thereto, a direct connection to the cellular network node; and
   select internet connectivity using a first internet protocol, IP, address associated with mesh functionality to route low priority, high delay tolerant data via both the cellular network node and the at least one other wireless remote communication unit configured as an edge router coupled to the cellular network node.

* * * * *